(12) United States Patent
Ramakrishnan et al.

(10) Patent No.: US 12,387,016 B2
(45) Date of Patent: Aug. 12, 2025

(54) PRESERVING WELLBORE INTEGRITY DURING CARBON DIOXIDE INJECTION

(71) Applicant: Schlumberger Technology Corporation, Sugar Land, TX (US)

(72) Inventors: Terizhandur S. Ramakrishnan, Boxborough, MA (US); Daniel Morrell, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 302 days.

(21) Appl. No.: 18/062,659

(22) Filed: Dec. 7, 2022

(65) Prior Publication Data

US 2024/0193315 A1 Jun. 13, 2024

(51) Int. Cl.
*G06F 30/13* (2020.01)
*E21B 47/005* (2012.01)
*E21B 47/007* (2012.01)
*E21B 47/07* (2012.01)

(52) U.S. Cl.
CPC .......... *G06F 30/13* (2020.01); *E21B 47/005* (2020.05); *E21B 47/007* (2020.05); *E21B 47/07* (2020.05); *E21B 2200/20* (2020.05)

(58) Field of Classification Search
CPC .......... G06F 30/00; G06F 30/13; G06F 30/28; G06F 2113/08; G06F 2119/08; G06F 2119/14; E21B 2200/20; E21B 47/007; E21B 47/07; E21B 47/005
USPC ................................................ 703/10, 6, 1
See application file for complete search history.

(56) References Cited

U.S. PATENT DOCUMENTS

| 2015/0030179 A1* | 1/2015 | Zhang | H04R 3/005 |
| | | | 381/92 |
| 2023/0281355 A1* | 9/2023 | Jandhyala | E21B 33/14 |
| | | | 703/10 |

FOREIGN PATENT DOCUMENTS

WO WO-2022105945 A1 * 5/2022 ............. E21B 33/13

OTHER PUBLICATIONS

Lau Chee Hen et al. "Successful Application of Slag Based Flexible Cement for Resilient and Carbon Dioxide Corrosion Resistance", Apr. 9-11, 2019, SPIE Oil and Gas India Conference and Exhibition, Society of Petroleum Engineers. (Year: 2019).*
Reddy, B.R. et al., "Cement Shrinkage Measurement in Oilwell Cementing—A Comparative Study of Laboratory Methods and Procedures", Apr. 16-18, 2007, SPE Rocky Mount Oil & Gas Technology Symposium, Society of Petroleum Engineers. (Year: 2007).*
D. Guillot and E. Nelson. Well Cementing. Schlumberger Educational Services, Sugar Land, Texas, 2006, pp. 21, 244, 279-280.
Aursand, P. et al. "Well integrity for CO2 injection from ships: Simulation of the effect of flow and material parameters on thermal stresses", International Journal of Greenhouse Gas Control, May 16, 2017, vol. 62, pp. 130-141.

(Continued)

*Primary Examiner* — Cedric Johnson
(74) *Attorney, Agent, or Firm* — Jeffrey D. Frantz

(57) ABSTRACT

Embodiments presented provide for a method to negate debonding of the casing from a cement in a wellbore. In one embodiment, the cement around the casing is set with a sufficiently large residual compressive stress, preventing the deboning.

17 Claims, 1 Drawing Sheet

(56) References Cited

OTHER PUBLICATIONS

Dong, X. et al. "Assessment on the cement integrity of CO2 injection wells through a wellbore flow model and stress analysis." Journal of Natural Gas Science and Engineering, Dec. 6, 2019, vol. 74, pp. 1-14.
Roy, P. et al. "Effect of thermal stress on wellbore integrity during CO2 injection", International Journal of Greenhouse Gas Control, Jul. 31, 2018, vol. 77, pp. 14-26.
Li, B. et al. "An analytical solution to simulate the effect of cement/formation stiffness on well integrity evaluation in carbon sequestration projects", Journal of Natural Gas Science and Engineering, Oct. 21, 2015, vol. 27, pp. 1092-1099.
Dou et al. "Cement Integrity Loss due to Interfacial Debonding and Radial Cracking during CO2 Injection", Energies. Sep. 3, 2020, vol. 13, Iss. 17, pp. 1-17.
International Search Report and Written Opinion issued in International Patent application PCT/ US2023/082701 dated Apr. 3, 2024, 12 pages.

* cited by examiner

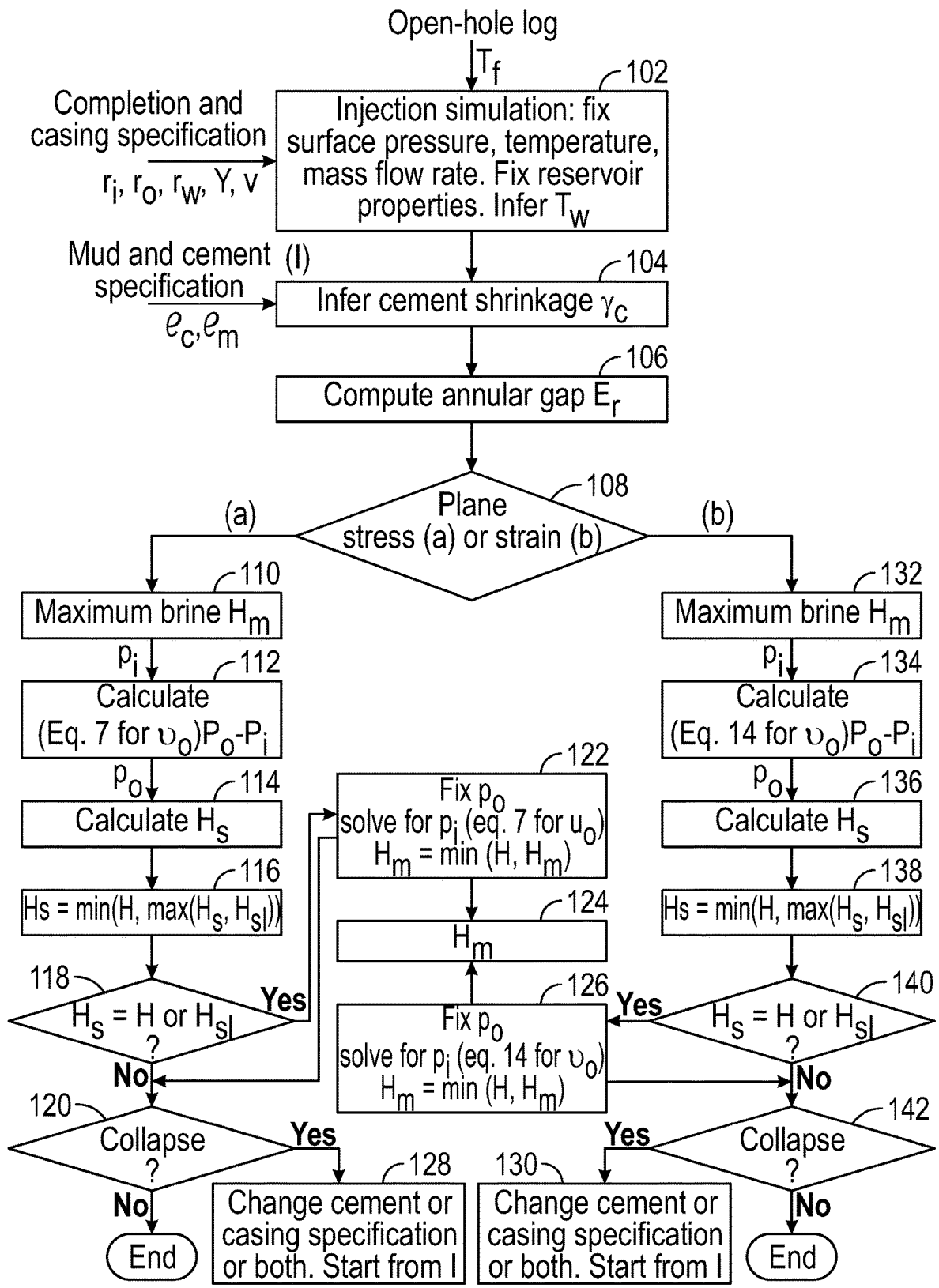

PRESERVING WELLBORE INTEGRITY DURING CARBON DIOXIDE INJECTION

CROSS-REFERENCE TO RELATED APPLICATIONS

None

FIELD OF THE DISCLOSURE

Aspects of the disclosure relate to cement shrinkage in a wellbore annulus that relates to undesirable leaks. More specifically, aspects of the disclosure relate to placement of cement in a wellbore that negates debonding of the cement/casing interface, allowing for a more leak-tight seal for the wellbore.

BACKGROUND

During carbon dioxide injection, downhole fluid temperature is dictated largely by surface temperature, adiabatic compression, and heat transfer from the surroundings to the injection tubing. When the temperature of perforations is substantially smaller than that of the formation, differential contraction of the casing and cement may lead to creation of a micro-annulus, eventually causing the injected carbon dioxide to leak undesirably. Often, this is compounded by cement shrinkage during setting and curing.

Injection casing may be installed as a liner or as a casing with an annulus running to the surface. For carbon storage, many carbon dioxide injection wells are run to the surface.

Casing is cemented to the formation by filling the annulus with a slurry and letting the cement cure over a period of a few days. As an example, conventional cements reach the requisite sheer strength in a matter of days. The annular cement slurry may lose filtrate (slurry minus solid particles that cannot percolate into the formation), and considerable effort is undertaken in cement formations to minimize this loss if not eliminate it altogether. Minimum cement height ($H_{sl}$) in the annulus is specified by regulations and may not reach mud line in order to prevent casing collapse from external pressure. By cementing to a height less than the wellbore height keeps cementing costs reduced.

Casing material dimensional specifications change slightly downhole. For one, casing undergoes stress-induced deformation due to the head of the fluid column. Second, its dimensions change due to formation temperature $T_f$ being different from ambient conditions at which the specifications are stated. Knowing the thermal and mechanical properties of the casing material allows us to estimate $r_i$ and $r_o$ at the base state from a surface state $r_i^*$ and $r_o^*$ for the inside and outside radii respectively. The base state corresponds to temperature $T=T_f$ and gauge pressure $p_m=\rho_m gH$, where the value H is the vertical depth at the location at which we desire to eliminate the micro annulus, g is the acceleration due to gravity and the value $\rho_m$ is the density of the mud column. Often, the value H corresponds to one or more positions in the caprock and the procedure below may be carried out for each of the locations. To estimate $r_o$ from $r_o^*$ the following equation (1) may be used:

$$r_o = r_o^* - p_m r_o^* \frac{1-v}{Y} + \alpha_s r_o^*(T_f - T_a), \quad (1)$$

where v is the Poisson ratio, Y is the Young's modulus, $\alpha_s$ is the coefficient of thermal expansion, and $T_a$ is the ambient temperature at which $r_o^*$ is specified. Similarly, $$r_i = r_i^* - p_m r_i^* \frac{1-v}{Y} + \alpha_s r_i^*(T_f - T_a), \quad (2)$$

It is with respect to the radii $r_i$ and $r_o$ that we prescribe a procedure that prevents delamination of cement from steel, and avoiding the formation of an undesirable micro-annulus. Because we are interested in differential deformations between changing operating environments and cement shrinkage, use of $r_i^*$ and $r_o^*$ in lieu of $r_i$ and $r_o$ does not affect leading order calculations. In practice, one should verify that the neglect of correction from the starred radii to $r_o$ and $r_i$ are practically inconsequential by checking that the differences are negligible, including the wall thickness, $r_o-r_i$.

A microannulus allows carbon dioxide to migrate both due to buoyancy and a pressure drive. During injection or its cessation, both the borehole and the surrounding temperature will shift from $T_f$ to $T_w$, the bottomhole temperature of carbon dioxide. This temperature is dictated by the surface temperature of carbon dioxide, heat transfer from surroundings, and the mass flow rate. Any of the well-bore dynamics models with mass, momentum, and energy equations should be able to provide us the bottomhole temperature as well as the bottomhole pressure as long as stable flow is maintained. The bottom-hole pressure should be consistent with reservoir dynamics for the requisite flow rate, and if not, the surface pressure needs to be changed; this can be automated sufficiently easily and is a known art in the industry. The bottom-hole pressure during injection is denoted as $p_f$.

In embodiments, usually, $p_m$ is kept higher than $p_f$, since drilling is more often than not, in overbalance. This is to prevent formation fluid production during drilling. For injection, $p_I$ is also necessarily higher than $p_f$. The difference between $p_I$ and $p_m$ is small enough to be neglected, since the fractional change in the outer radius due to this is approximately—$(p_I-p_m)(1-v)/Y$. As an example, for $p_I-p_m \approx 3$ MPa, v=0.3, and Y=207 GPa, change in $r_o$ from 0.1 m is only 1 µm, a relatively inconsequential amount, and may therefore be ignored.

The variables that are relevant for annulus formation are the temperature change from $T_f$ to $T_w$, the pressure change from $p_I$ to $p_f$ upon cessation of injection, and the shrinkage of cement during curing. The latter is a resident annulus before onset of injection. Among these, just as the change from $p_m$ to $p_I$ causes negligible effect on the radius, the change from $p_I$ to $p_f$ has little impact on the annular dimension. Thus, any completion method should be such that the expansion of the annulus due to temperature and shrinkage is compensated.

There is a need to provide an apparatus and methods that provide for safe carbon dioxide injection into wells without leakage due to various factors, such as changes in temperature and pressure.

There is a further need to provide methods that do not have the drawbacks discussed above, namely debonding of the interface between casing and cement within the well.

There is a still further need to reduce economic costs associated with operations and apparatus described above with conventional tools and limit the well debonding issues that may require remediation in conventional wells.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of designing a wellbore with a cement residual compressive stress layer around a casing is disclosed. The method may comprise obtaining data related to an open hole log for a wellbore in a field and performing a simulation for injection of a fluid within the field with a desired mass flow rate, a given surface temperature and anticipated designed perforations, the simulation computing a loading on the wellbore. The method may also provide for inferring densities of a mud and a cement slurry used within the field from a first mud specification and a first cement specification to be used with the wellbore and estimating a value of cement shrinkage ($\gamma_c$). The method may also provide for computing a possible extent for shrinkage of material around the wellbore based upon the value of cement shrinkage ($\gamma_c$). The method may also provide for evaluating the wellbore with the loading to determine if a case of plane stress or plane strain model governs the wellbore based upon the simulation, wherein: for a case of the plane stress governing the wellbore based upon the loading method steps of: setting a maximum brine height for the wellbore, calculating a plane stress coefficient value, calculating a value of plane stress for the wellbore, calculating a value of a height of slurry for the wellbore are accomplished. The method may also provide for a case of plane strain governing the wellbore based upon the loading, setting a maximum brine height for the wellbore; calculating a plane strain coefficient value, calculating a value of plane stress for the wellbore and calculating a value of a height of slurry for the wellbore. The method may also provide for determining if a collapse of a casing occurs for the loading based upon the loading either of the plane stress or plane strain case values, wherein in an event of the collapse, one of a second casing specification and a second cement specification is chosen and a second simulation is run and writing all input and calculated parameters to a non-volatile memory.

In one example embodiment, a method of designing a wellbore with a cement residual compressive stress layer around a casing is disclosed. This embodiment provides for obtaining data related to an open hole log for a wellbore in a field and performing a simulation for injection of a fluid within the field with a desired mass flow rate, a given surface temperature and anticipated designed perforations, the simulation computing a loading on the wellbore. The method further provides for inferring densities of a mud and a cement slurry used from a first mud specification and a first cement specification to be used with the wellbore and estimating a value of cement shrinkage $\gamma_c$. The method further provides for computing a possible extent for shrinkage of material around the wellbore based upon the value of cement shrinkage ($\gamma_c$). The method further provides for determining necessary compressive stresses on the casing for the cases of plane stress or plane strain. For a case of the plane stress governing the wellbore steps of: setting a maximum mud or brine height for the wellbore; calculating deformation and resulting necessary slurry height, checking whether this is acceptable and if at bounds, recalculating the mud height, verifying possibility of collapse, and finally providing the recommended slurry and mud heights. The method may also be performed wherein for a case of plane strain governing the wellbore based upon the loading, calculating the deformation and resulting slurry height, checking whether this is acceptable and if at bounds, recalculating the mud height, verifying possibility of collapse and finally providing the recommended slurry and mud heights. The method may also provide for determining if a collapse of a casing occurs for the loading based upon the loading either of the plane stress or plane strain case values, wherein in an event of the collapse, one of a second casing specification and a second cement specification is chosen and a second simulation is run and writing all input and calculated parameters to a non-volatile memory.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

FIG. 1 is a method of preserving wellbore integrity during carbon dioxide injection, in one example embodiment of the disclosure.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

As mentioned before, the two large dimensional changes to the annulus are due to temperature difference between the original setting value and that during injection, i.e., $T_w-T_f$. The other is due to shrinkage during curing, and may be regarded as a percentage of the annular gap $r_w-r_o$, where $r_w$ is the wellbore drilled radius.

In one example embodiment, a casing with cured cement is assumed to be undergoing a temperature change from $T_f$ to $T_w$. Now, the outer radius of the casing, $r_o$ is the same as the inner radius of the cement. The change in the internal position of the steel casing and cement, post temperature change, for the same stress state, are different. The position $r_o$ shifts to $r_o\alpha_s(T_w-T_f)$ for steel casing, and $r_o\alpha_c(T_w-T_f)$ for cement, where $\alpha_c$ is the coefficient of thermal expansion for cement. The net increase in the annulus width due to temperature becomes $$\Delta_{rT}=-r_o(\alpha_s-\alpha_c)(T_w-T_f) \tag{3}$$

For $T_w<T_f$, when $\alpha_s>\alpha_c$, $\Delta_{rT}>0$. If the initial stress level was zero, steel would debond from the casing, if cement-steel interface is weak to a tensile load. More often than not, the steel-cement bond has a low tensile strength, and microannulus formation is the inevitable result.

Compounding this, is the cement shrinkage during curing. When the cement is in slurry form, shrinkage has no relevance to microannulus formation, since any loss of volume is compensated by flow caused by the cement column height. Additives, and judicious control of slurry composition may also be pursued to reduce any compromise of annular seal. However, a net decrease in annular dimension of a setting cement may occur during the curing stage once sufficient compressive strength is developed. Studies report a range of 0.5 to 5% bulk shrinkage, though it is unclear whether all or what fraction of this contributes to an annular radial reduction in cement. For example, some of the shrinkage may be compensated by the overlying cement slurry slumping downward.

Here, we assume characterization of the possibility of a microannulus forming through shrinkage in terms of $\gamma_c$, where $\gamma_c(r_w-r_o)$ is the shrinkage in the radial direction. $\gamma_c$ is best obtained experimentally, and is probably overestimated in a laboratory-scale experiment, unless the requisite pressure head is imposed.

It is assumed that casing deformations are within elastic limits. For a casing with an internal pressure $p_i$ and outer pressure $p_o$, the deformation based on axisymmetric stress-strain model at $r=r_o$ at $T=T_f$, assuming plane stress is $$u_o = \frac{r_o[2p_ir_i^2 - p_or_o^2(1-v) - p_or_i^2(1+v)]}{Y(r_o^2-r_i^2)} \tag{4}$$

When $p_i=p_o=p_m$, we obtain the second term of the right hand side in Eq. 1.

Dimensional Changes and Pressure Criterion

The two contributors for annular expansion $E_r$ are the temperature difference between the downhole injected carbon dioxide and the formation temperature, and curing-induced cement shrinkage. It is assumed that temperature during curing is close to $T_f$. Shrinkage is $\gamma_c(r_w-r_o)$, and therefore the possible extent of annulus lacking cement is $$E_r=-r_o(\alpha_s-\alpha_c)(T_w-T_f)+\gamma_c(r_w-r_o). \tag{5}$$

In aspects of the disclosure, this annular expansion possibly leading to a microannulus is prevented by compressing the casing, thereby have a residual compressive stress in the cured cement. Thus, $p_o$ is set sufficiently larger than $p_i$ for $u_o$ to be negative enough such that $$\frac{r_o[2p_ir_i^2 - p_or_o^2(1-v) - p_or_i^2(1+v)]}{Y(r_o^2-r_i^2)} - \tag{6}$$

$$r_o(\alpha_s-\alpha_c)(T_w-T_f)+\gamma_c(r_w-r_o) \le 0.$$

To have a quick practical estimate, it is useful to rewrite $u_o$ in the form $$u_0 = -\frac{p_i(1-v)r_o}{Y} - \frac{(p_o-p_i)r_o^3}{Y(r_o^2-r_i^2)}\left[(1-v)+(1+v)\frac{r_i^2}{r_0^2}\right] \tag{7}$$

and realize that both an increase in $p_i$, and $p_o-p_i$, makes the casing to contract, or in other words, set the cement in a compressive state. Among the two terms, the second is dominant. Ignoring the first term, it is then evident that for the needed $-u_o$ to compensate for $E_r$, increasing $p_o$, to the highest possible value also increases $p_i$. Including $p_i$ in the next iteration, simply decreases the magnitude of $p_o-p_i$, usually by a small amount. This may be continued until convergence, which is attained in a few steps. A first approach is presented herein. Considerations are to be given with regard to the limits on the maximum values that are allowable for the chosen casing.

A quick estimate based on the above expression is possible by first noting that the first term is a small fraction of the second in Eq. 7. Neglect of the first term is erring on the safe side, since any value of $p_i$ only contracts the casing further for a fixed $p_o-p_i$. Then, a safe estimate for the over pressure in the cementing column over that of the interior of the casing can be based on $$\frac{(p_o - p_i)r_o^3}{Y(r_o^2 - r_i^2)}\left[(1-v) + (1+v)\frac{r_i^2}{r_o^2}\right] \geq -r_o(\alpha_s - \alpha_c)(T_w - T_f) + \gamma_c(r_w - r_o). \quad (8)$$

The condition above means that the reduction in casing radius due to excess external pressure is sufficient to overcome cement shrinkage and cooling induced casing detachment, with a safety term equal to $p_i(1-v)r_o/Y$.

In another example embodiment, an alternative method assumes the maximum possible value of $p_i$. This entails filling the borehole entirely with brine (or mud), allowing to calculate the least possible $p_o-p_i$. If this $p_o-p_i$ requires a cement column height greater than well-bore vertical depth, the slurry column is fixed to equal the well-bore height, and solve for $p_i$. If $p_o-p_i$ is such that the slurry column needs to be less than the well-bore height, we use $p_o$ for the required slurry height. This will then compensate for $E_r$. The advantage of this method is that $p_o-p_i$ is lower here than in the previous approach. But one has to be cautious that the cement column meets the minimum height requirement. If the minimum height of $H_{sl}$ is not met in this computation, we can set the slurry height to be this minimum value $(H_{sl})$, which fixes $p_o$. We then compute $p_i$ from Eq. 7 to compensate for $E_r$, and evaluate the amount of brine to be pumped out of the wellbore. No iterative updating is needed. In the alternative method, a lower $p_o-p_i$ is obtained for the requisite $u_o$ to offset $E_r$, and better facilitates meeting collapse avoidance requirement than the first method.

We call the first and the second methods as the maximum slurry and the maximum brine approaches. These are best illustrated through calculations.

Numerical Example

We first illustrate the numerical example for the maximum slurry approach, and as an iterative process, in order to delineate the contributions of $p_i$ and $p_o-p_i$. As an example, for casing, we use Y=207 GPa and v=0.3. Dimensions are $r_o$=0.1222375 m, $r_i$=0.1083945 m, and $r_w$=0.155575 m. Thermal expansion coefficients vary with temperature, and particularly so for cements, but as an average we have set $\alpha$=12×10$^{-6}$K$^{-1}$ and $\alpha_c$=9.5×10$^{-6}$K$^{-1}$. We consider the case where the formation temperature $T_f$ is 80° C., and the injected stream at the depth where seal is desired is at a $T_w$ of 50° C. With a volumetric shrinkage percentage of 1%, we set $\gamma_c$=0.01/3. The annular gap under conditions of zero stress would then be $E_r$, and based on the parameters stated above is calculated to be 120.3 µm. To compensate for this, we need to keep the casing in a compressed state while the cement is in the form of slurry in the annulus. The required $p_o-p_i$ based on the approximate evaluation using Eq. 8 is 25.3 MPa.

To illustrate this further, it is assumed that a well where the overlying caprock at which a good seal is required is at a depth of 3000 m. For a cement-slurry density ($\rho_c$) of 2000 kg m$^{-3}$, the maximum gauge pressure for a cement column under atmospheric pressure at a depth of 3000 m is approximately 58.8 MPa. With a brine of density 1000 kg m$^{-3}$ in the well bore, gauge pressure at this depth is 29.4 MPa. The pressure difference between the two is 29.4 MPa and exceeds the requirement of 25.3 MPa. Maintaining a full column of brine within the wellbore, and including $p_i$ correction for $u_o$, $p_o-p_i$ drops to 22.7 MPa. Thus, the slurry height may be reduced by about 682 m to about 2318 m, the result assuming that a brine column rests above the slurry in the annulus. One has to verify that this is well within the collapse rating of the casing as discussed below. Additionally, 2318 m must exceed $H_{sl}$.

For a $\gamma_c$ of 0.015/3, the situation is quite different. The first approximation based on Eq. 8 results in $p_o-p_i$=36.9 MPa. Then the maximum $p_i$ to have sufficient compression on the casing reduces to 58.8−36.9=21.9 MPa. For an assumed density of 1000 kg m$^{-3}$, this corresponds to a brine height $H_m$ of 2230 m within the wellbore. This implies that 3000−2230=770 m of brine within the casing should be pumped out after the slurry is pumped into the annulus. It is useful to check that $p_o-p_i$ is within the limits of collapse of the casing. In this particular instance, the collapse pressure for the N-80 casing is stated to be 45.6 MPa and $p_o-p_i$ is less than this by 45.6−36.9=8.7 MPa, a satisfactory result. A second iteration to correct for the effect of $p_i$ in the estimated safe $p_o-p_i$ is based on $$\frac{(p_o - p_i)r_o^3}{Y(r_o^2 - r_i^2)}\left[(1-v) + (1+v)\frac{r_i^2}{r_o^2}\right] \geq \quad (9)$$
$$-r_o(\alpha_s - \alpha_c)(T_w - T_f) + \gamma_c(r_w - r_o) - \frac{\rho_m g H_m(1-v)r_o}{Y},$$

and reduces $p_o-p_i$ to 35 MPa from 36.9 MPa. A new brine height may be calculated based on this updated requirement, and iterated until convergence. The first update of 35 MPa sets the brine height at 2424 m, and reduces the height of brine to be pumped to 3000−2424=576 m from the wellbore. Reapplying Eq. 9, reduces $p_o-p_i$ to 34.9 MPa, quite close to the previous step, with $H_m$=2440 m. In the next iteration $p_o-p_i$ remains the same to three digits, but $H_m$ changes marginally to 2442 m. Reducing $p_o-p_i$ from the initial estimate of 36.9 MPa to 34.9 MPa, provides a larger safety margin from collapse. Note that once $p_o$ is fixed, $p_i$ may be obtained directly without iteration (and in practice, we do), although the iterative method is physically instructive. The maximum brine method given later will revert to the maximum slurry method, since keeping the borehole entirely filled with brine will lead to a slurry height larger than the well-bore height.

Developing further, let us consider $\gamma_c$=0.02/3. First approximation from Eq. 8 yields a value of $p_o-p_i$=48.6 MPa. Further iterations reduces $p_o-p_i$ to 47.7 MPa. This is above the collapse pressure of 45.6 MPa. A few alternatives are possible to circumvent this issue of staying below collapse pressure.

Consider cement additives or alterations to lower $\gamma_c$.

Increase the temperature $T_w$ by increasing the surface injection temperature. When cement shrinkage dominates as in this example, this is unlikely to be of much help. For the case of $\gamma_c$=0.02/3, even an increase of $T_w$ to 70° C., reduces $p_o-p_i$ to only 46.2 MPa, a reduction of 1.5 MPa from what was needed with $T_w$, =50° C.

Change the casing to one with a higher collapse pressure, noting that this may have a higher Y, and therefore will provide less of a compensation for the same $p_o-p_i$. One has to carry out a similar calculation with updated specifications of Y and as.

Experiment with casing sizes. As an example, for the case of $\gamma_c$=0.02/3, changing to $r_i$ to 0.101725 m, $p_o-p_i$ in the first pass is 53.5 MPa, with further iterations reducing it to 53.0 MPa. Fortunately, the collapse pressure for this choice is 54.4 MPa, and is therefore a viable solution.

For the stated casing properties, and a choice of $T_w$, it is desirable to set an upper limit of $\gamma_c$ to ensure the absence of micro-annulus. In our calculations, for $r_i$=0.1083945 m, we find that a $\gamma_c$=0.0191/3 leads to a $p_o-p_i$ of 45.4 MPa, just below the collapse pressure.

In contrast to the maximum slurry method, the maximum brine approach sets the highest possible brine column, and computes the required slurry height for compensating $E_r$. Filling the borehole with a fluid of density 1000 kg m$^{-3}$, at a vertical depth of 3000 m, $p_i$=29.4 MPa. For $\gamma_c$=0.01/3, with this $p_i$, we get $p_o-p_i$=22.7 MPa using Eq. 7 to compensate for $E_r$. Then, $p_o$=52.1 MPa, for a $\rho_c$=2000 kg m$^{-3}$. This leads to a required slurry height $H_s$ of 2659 m if no brine is present above the slurry and 2318 m if brine is present. Since $H_s$ is less than 3000 m, the strategy is feasible. The result is obviously consistent with the maximum slurry approach.

For a $\gamma_c$=0.015/3, the method leads to a $H_s$=3255 m. Since this exceeds H, the maximum slurry method is reverted to.

One approach is to apply the maximum brine method first. Eq. 7 is used to compensate for $E_r$, since $p_i$ is known. When $H_s$ is below the minimum required height, we set $H_s$ to this minimum value. When $H_s$ exceeds H, we set the slurry height to H, and apply the maximum slurry approach for inferring $p_i$.

Plane Strain

Until now, it is assumed that the well-bore is unrestrained longitudinally. Deformation results of Eqs. 1 and 2, and Eqs. 4 and 7 are based on this assumption. For cases where the longitudinal deformation is prevented at the ends, plane strain results must be used. Eqs. 1 and 2 get modified to $$r_o = r_o^* - p_m r_o^* \frac{(1+v)(1-2v)}{Y} + \alpha_s r_o^*(T_f - T_a), \quad (10)$$

$$r_i = r_i^* - p_m r_i^* \frac{(1+V)(1-2V)}{Y} + \alpha_s r_i^*(T_f - T_a). \quad (11)$$

For plane strain, Eq. 4, is modified to $$u_o = \frac{r_o(1+V)[2p_i r_i^2 - p_o r_o^2(1-2v) - r_i^2(p_0 + 2vp_i)]}{Y(r_o^2 - r_i^2)} \quad (12)$$

Accordingly, the criterion for preventing microannulus is, $$\frac{r_o(1+v)[2p_i r_i^2 - p_o r_o^2(1-2v) - r_i^2(p_o + 2vp_i)]}{Y(r_o^2 - r_i^2)} - \quad (13)$$
$$r_o(\alpha_s - \alpha_c)(T_w - T_f) + \gamma_c(r_w - r_o) \leq 0.$$

Similarly, for estimating $p_o-p_i$ to avoid microannulus, and iterative updating, analogous to Eq. 7, the deformation of Eq. 12 is expressed in the form, $$u_0 = \frac{-(1+v)(1-2v)p_i r_0}{Y} - \frac{r_o(1+v)}{Y(r_o^2 - r_i^2)}\{r_i^2 + r_o^2 - 2vr_o^2\}(p_o - p_i). \quad (14)$$

This separates the leading order $p_o-p_i$ dependence from the $p_i$ term for rapid iterative convergence, as illustrated previously for the plane stress case. Note again that once $p_o$ is fixed $p_i$ may be calculated explicitly.

Along the lines of Eq. 8, for plane strain, a safe first pass estimate for the required $p_o-p_i$ is obtained from $$\frac{r_o(1+v)}{Y(r_o^2 - r_i^2)}\{r_i^2 + r_o^2 - 2vr_o^2\}(p_0 - p_i) \geq \quad (15)$$
$$-r_o(\alpha_s - \alpha_c)(T_w - T_f) + \gamma_c(r_w - r_o).$$

For the same example as in the plane stress case, with $\gamma_c$=0.01/3, to compensate for $E_r$=120.3 μm, a converged $p_o-p_i$ of 26.1 MPa is found to be adequate. For plane stress, the converged result is 22.7 MPa, the first pass iteration being 25.3 MPa. This suggests that given all other conditions being the same, a cement formulation with a lower $\gamma_c$ is needed for the plane strain case than the plane stress condition.

Workflow

The steps may be summarized as follows, in one example embodiment. It is assumed that the well-bore radius, the casing outer diameter, and casing material are provided. These are often based on drilling conditions, flow rate requirements, in situ stress, cost, injection rates, corrosion prevention etc. Usually, a first pass choice of wall thickness is also available.

1. For the given completion and casing specifications, and formation interval, we know $r_w$, $r_i$ and $r_o$, and Y and v. Additionally, open-hole logs provide $T_f$. We simulate injection, in FIG. 1 at 102, for the desired mass flow rate, at given surface temperature conditions of the delivered carbon dioxide, subsurface properties, and designed perforations. At this point, $T_w$ is known.
2. Based on mud and cement-slurry properties infer their densities $\rho_m$ and $\rho_c$ respectively.
3. Given the cement characteristics, estimate $\gamma_c$ at 104.
4. Compute $E_r$ at 106.
5. Based on casing completion, infer whether plane-stress or plane-strain model is to be used at 108.
6. Set the brine height to the maximum value allowed. Often this means that $H_m$=H at 110 and 132. This permits evaluation of $p_i$ at 112. From Eq. 7, obtain $p_o-p_i$ by setting $u_o+E_r$=0. $p_o$ is now known for avoiding annulus. For the plane strain case, Eq. 14 is used at 134.
7. Calculate $H_s$ at 114. The results will be different if there is an air or brine column above slurry. For the strain case calculate $H_s$ at 136.
8. $H_s$ has to be greater than $H_{sl}$, but cannot exceed H. If $H_s$ is between the limits, let the brine height be unaltered, and pump slurry up to $H_s$, with brine or air above as set while computing $H_s$. at 116. For the strain case, step 138 is used.
9. If $H_s$ equals H, fix $p_o$ at 122 according to the limit set, solve for $p_i$, using Eq. 7, and $u_o+E_r$=0. If $H_s$=$H_{sl}$, then simply set $H_m$=H at 118. For the strain case, step 140 is used.
10. For $p_i$ resulting in $H_m$<H, compute amount of brine to be pumped out at 124.
11. For plane strain, at 126, use Eq. 12 in lieu of Eq. 4 and Eq. 14 instead of Eq. 7 for use in $u_o+E_r$=0.
12. Verify that $p_o-p_i$ will not cause casing collapse at 120 or 142. If found to be so, alter cement additives to lower $\gamma_c$. If no adequate formulation is suitable, change casing specifications, and carry out the calculation from start at 128 or 130. If this is also proven to be insufficient, attempt at increasing $T_w$ and repeat calculation.

In one example embodiment, a method of designing a wellbore with a cement residual compressive stress layer around a casing is disclosed. The method may comprise obtaining data related to an open hole log for a wellbore in a field and performing a simulation for injection of a fluid within the field with a desired mass flow rate, a given surface temperature and anticipated designed perforations, the simulation computing a loading on the wellbore. The method may also provide for inferring densities of a mud and a cement slurry used within the field from a first mud specification and a first cement specification to be used with the wellbore and estimating a value of cement shrinkage ($\gamma_c$). The method may also provide for computing a possible extent for shrinkage of material around the wellbore based upon the value of cement shrinkage ($\gamma_c$). The method may also provide for evaluating the wellbore if a case of plane stress or plane strain model governs the wellbore, wherein: for a case of the plane stress governing the wellbore based upon the loading method steps of: setting a maximum brine height for the wellbore, calculating a plane stress coefficient value, calculating a value of stress and radial strain for the wellbore, calculating a value of a height of slurry for the wellbore are accomplished. Based upon the value of the height of the slurry and its bounds, a recalculated brine height may be accomplished. The method may also provide for a case of plane strain governing the wellbore based upon the loading, setting a maximum brine height for the wellbore; calculating a plane strain coefficient value, calculating a value of stress and radial strain for the wellbore and calculating a value of a height of slurry for the wellbore. Based upon the value of the height of the slurry and its bounds, a recalculated brine height may be accomplished. The method may also provide for determining if a collapse of a casing occurs for the loading based upon the loading either of the plane stress or plane strain case values, wherein in an event of the collapse, one of a second casing specification and a second cement specification is chosen and a second simulation is run and writing all input and calculated parameters to a non-volatile memory.

In one example embodiment, the method may be performed wherein the fluid is carbon dioxide.

In another example embodiment, the method may be performed wherein the value of $\gamma_c$ is obtained experimentally.

In another example embodiment, the method may further comprise displaying input and calculated parameters on a monitor.

In another example embodiment, the method may further comprise setting a new maximum brine height based, at least in part, on a height of a slurry.

In another example embodiment, the method may be performed wherein in the case of plane stress, a value of stress and radial strain are estimated.

In another example embodiment, the method may be performed wherein in the case of plane strain, a value of stress and radial strain is estimated.

In another example embodiment, the method may be performed wherein the obtaining data related to an open hole log for the wellbore in the field includes a formation temperature.

In another example embodiment, the method may be performed wherein the obtaining data related to an open hole log for the wellbore includes specifying a mass flow rate of fluid to be pumped downhole.

In one example embodiment, a method of designing a wellbore with a cement residual compressive stress layer around a casing is disclosed. This embodiment provides for obtaining data related to an open hole log for a wellbore in a field and performing a simulation for injection of a fluid within the field with a desired mass flow rate, a given surface temperature and anticipated designed perforations, the simulation computing a loading on the wellbore. The method further provides for inferring densities of a mud and a cement slurry used within the field from a first mud specification and a first cement specification to be used with the wellbore and estimating a value of cement shrinkage $\gamma_c$. The method further provides for computing a possible extent for shrinkage of material around the wellbore based upon the value of cement shrinkage ($\gamma_c$). The method further provides for evaluating the wellbore with the loading to determine if a case of plane stress or plane strain model governs the wellbore, wherein for a case of the plane stress governing the wellbore steps of: setting a maximum brine (mud) height for the wellbore, calculating a value of stress and radial strain for the wellbore and calculating a value of a height of slurry, and check whether it is at a bound and if so recalculate brine height for the wellbore. The method may also be performed wherein for a case of plane strain governing the wellbore, setting a maximum brine (mud) height for the wellbore, calculating a stress and radial strain for the wellbore, calculating a value of a height of slurry for the wellbore, check this value against the bounds, and if at a bound, recalculate brine height. The method may also provide for determining if a collapse of a casing occurs for the loading based upon the loading either of the plane stress or plane strain case values, wherein in an event of the collapse, one of a second casing specification and a second cement specification is chosen and a second simulation is run and writing all input and calculated parameters to a non-volatile memory.

In one example embodiment, the method may be performed wherein the fluid is carbon dioxide.

In another example embodiment, the method may be performed wherein the value of $\gamma_c$ is obtained experimentally.

In another example embodiment, the method may further comprise displaying input and calculated parameters on a monitor.

In another example embodiment, the method may be performed wherein in the case of plane stress, a value of stress and radial strain is estimated.

In another example embodiment, the method may be performed wherein in the case of plane strain, a value of stress and radial strain is estimated.

In another example embodiment, the method may be performed wherein the obtaining data related to an open hole log for the wellbore in the field includes a formation temperature.

In another example embodiment, the method may be performed wherein the obtaining data related to an open hole log for the wellbore includes specifying a mass flow rate of fluid to be pumped downhole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of designing a wellbore with a cement residual compressive stress layer around a casing, the method comprising:
 obtaining data related to an open hole log for a wellbore in a field;
 performing a simulation for injection of a fluid within the field with a desired mass flow rate, a given surface temperature, and anticipated designed perforations, the simulation computing downhole temperature on the wellbore;
 inferring densities of a mud and a cement slurry used within the field from a first mud specification and a first cement specification to be used with the wellbore;
 estimating a value of cement shrinkage ($\gamma_c$);
 computing a possible extent for shrinkage of material around the wellbore based upon the value of cement shrinkage ($\gamma_c$);
 evaluating the wellbore with a loading to determine whether a plane stress model or a plane strain model governs a radial deformation of the wellbore;
 in response to determining that the plane stress model governs the radial deformation of the wellbore, performing a first set of operations comprising:
  setting a maximum brine height for the wellbore,
  calculating a plane stress coefficient value,
  calculating a value of stress and the radial deformation for the wellbore,
  calculating a slurry height for the wellbore, and
  reevaluating the maximum brine height in response to determining that the slurry height is at an upper bound or a lower bound;
 in response to determining that the plane strain models governs the radial deformation of the wellbore, performing a second set of operations comprising:
  setting the maximum brine height for the wellbore,
  calculating a plane strain coefficient value,
  calculating a value of plane stress for the wellbore,
  calculating the slurry height for the wellbore, and
  reevaluating the maximum brine height in response to determining that the slurry height is at the upper bound or the lower bound the bounds;
 determining whether a collapse of a casing occurs for the loading based on calculated results of a governing model of the plane stress model or the plane strain model;
 in response to determining that the collapse of the casing occurs, selecting one of a second casing specification and a second cement specification;
 running a second simulation for injection of the fluid within the field using a selected one of the second casing specification and the second cement specification;
 writing all input and calculated parameters to a non-volatile memory; and
 controlling a filling of the wellbore with cement slurry and brine using the selected one of the second casing specification and the second cement specification, wherein the cement slurry is filled to the slurry height and the brine is filled to the maximum brine height.

2. The method according to claim 1, wherein the fluid is carbon dioxide.

3. The method according to claim 1, wherein the value of $\gamma_c$ is obtained experimentally.

4. The method according to claim 1, further comprising: setting a new maximum brine height based, at least in part, on the slurry height.

5. The method according to claim 1, further comprising: displaying input and calculated parameters on a monitor.

6. The method according to claim 1, wherein, for a governance of the plane stress model, a value of stress and radial strain is estimated.

7. The method according to claim 1, wherein, for a governance of the plane strain model, a value of stress and radial strain is estimated.

8. The method according to claim 1, wherein the obtaining data related to an open hole log for the wellbore in the field includes a formation temperature.

9. The method according to claim 1, wherein the obtaining data related to an open hole log for the wellbore includes specifying a mass flow rate of fluid to be pumped downhole and determining downhole fluid temperature.

10. A method of designing a wellbore with a cement residual compressive stress layer around a casing, the method comprising:
 obtaining data related to an open hole log for a wellbore in a field;
 performing a simulation for injection of a fluid within the field with a desired mass flow rate, a given surface temperature, and anticipated designed perforations, the simulation computing downhole temperature on the wellbore;
 inferring densities of a mud and a cement slurry used within the field from a first mud specification and a first cement specification to be used with the wellbore;
 estimating a value of cement shrinkage $\gamma_c$;
 computing a possible extent for shrinkage of material around the wellbore based upon the value of cement shrinkage ($\gamma_c$);
 evaluating the wellbore with a loading to determine whether a plane stress model or a plane strain model governs the wellbore deformation, wherein:
  in response to determining that the plane stress model governs the wellbore, performing a first set of operations comprising:
   setting a maximum brine height for the wellbore,
   calculating a plane stress coefficient value,
   calculating a value of stress and radial strain for the wellbore,
   calculating height for the wellbore,
   recalculating the maximum brine height in response to determining that the slurry height is at an upper bound or a lower bound; and
  in response to determining that the plane strain model governs the wellbore, performing a second set of operations comprising:
   setting the maximum brine height for the wellbore,
   calculating a plane strain coefficient value,
   calculating the value of stress and radial strain for the wellbore,
   calculating the slurry height for the wellbore,
   recalculating the maximum brine height in response to determining that the slurry height is at the upper bound or the lower bound;
 determining whether a collapse of a casing occurs for the loading based upon a governance of the plane stress model or the plane strain model;
 in an event of the collapse, selecting one of a second casing specification and a second cement specification;
 running second simulation;

writing all input and calculated parameters to a non-volatile memory; and controlling a filling of the wellbore with cement slurry and brine using a selected one of the second casing specification and the second cement specification, wherein the cement slurry is filled to the slurry height and the brine is filled to the maximum brine height.

11. The method according to claim 10, wherein the fluid is carbon dioxide.

12. The method according to claim 10, wherein the value of $\gamma_c$ is obtained experimentally.

13. The method according to claim 10, further comprising:

displaying the input and calculated parameters on a monitor.

14. The method according to claim 10, wherein, for a governance of the plane stress model, values of stress, and radial strain are estimated.

15. The method according to claim 10, wherein, for a governance of the plane strain model, a value of stress, and radial strain are estimated.

16. The method according to claim 10, wherein the obtaining data related to an open hole log for the wellbore in the field includes a formation temperature.

17. The method according to claim 10, wherein the obtaining data related to an open hole log for the wellbore includes specifying a mass flow rate and determining downhole temperature of the fluid to be pumped downhole.

\* \* \* \* \*